United States Patent
Naiki

(10) Patent No.: US 11,012,268 B2
(45) Date of Patent: May 18, 2021

(54) RECEIVING APPARATUS AND NON-TRANSITORY COMPUTER READABLE MEDIUM STORING RECEIVING PROCESSING PROGRAM

(71) Applicant: JVCKENWOOD CORPORATION, Yokohama (JP)

(72) Inventor: Yasunori Naiki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/909,154

(22) Filed: Jun. 23, 2020

(65) Prior Publication Data
US 2020/0412587 A1    Dec. 31, 2020

(30) Foreign Application Priority Data
Jun. 26, 2019    (JP) .............................. JP2019-118200

(51) Int. Cl.
*H04L 25/03*    (2006.01)

(52) U.S. Cl.
CPC .. *H04L 25/03993* (2013.01); *H04L 25/03834* (2013.01)

(58) Field of Classification Search
CPC ................................................ H04L 25/03993
See application file for complete search history.

(56) References Cited

U.S. PATENT DOCUMENTS

| | | | | |
|---|---|---|---|---|
| 4,977,615 A | * | 12/1990 | Suzuki | H04B 7/0805 455/277.2 |
| 2009/0147891 A1 | * | 6/2009 | Furukawa | H03D 3/007 375/346 |
| 2009/0274251 A1 | * | 11/2009 | Gozen | H04H 40/72 375/346 |

FOREIGN PATENT DOCUMENTS

JP    H04-278729 A    10/1992

* cited by examiner

*Primary Examiner* — Nader Bolourchi
(74) *Attorney, Agent, or Firm* — Procopio, Cory, Hargreaves & Savitch LLP

(57) ABSTRACT

A receiving apparatus includes: a first pulse noise determining circuit configured to determine the presence or the absence of pulse noise in the receiving signal based on a first threshold; a first pulse noise removing circuit configured to remove pulse noise in the receiving signal based on the result of the determination made by the first pulse noise determining circuit; a bandwidth limiting filter configured to limit a receiving signal whose pulse noise has been removed by the first pulse noise removing circuit to a predetermined bandwidth; a second pulse noise determining circuit configured to determine the presence or the absence of pulse noise in the receiving signal whose bandwidth has been limited by the bandwidth limiting filter based on a second threshold; and a threshold control circuit configured to adjust a first threshold based on the result of the determination made by the second pulse noise determining circuit.

4 Claims, 11 Drawing Sheets

RECEIVING APPARATUS AND NON-TRANSITORY COMPUTER READABLE MEDIUM STORING RECEIVING PROCESSING PROGRAM

CROSS REFERENCE TO RELATED APPLICATION

This application is based upon and claims the benefit of priority from Japanese patent application No. 2019-118200, filed on Jun. 26, 2019, the disclosure of which is incorporated herein in its entirety by reference.

BACKGROUND

The present disclosure relates to a receiving apparatus and a receiving processing program, and relates to, for example, a receiving apparatus and a receiving processing program suitable for removing pulse noise with a high accuracy.

In general, a receiving apparatus includes a bandwidth limiting filter that removes an untargeted signal included in a receiving signal by limiting the bandwidth of the receiving signal and a noise blanker that blocks propagation of extraneous pulse noise included in the receiving signal.

For example, Japanese Unexamined Patent Application Publication No. H04-278729 discloses a receiving apparatus including a bandwidth limiting filter and a noise blanker. This receiving apparatus further adjusts a band limiting width of the bandwidth limiting filter in accordance with an amount of noise included in the receiving signal whose bandwidth has been limited by the bandwidth limiting filter. Accordingly, this receiving apparatus improves signal intelligibility by efficiently removing extraneous noise.

SUMMARY

In the receiving apparatus disclosed in Japanese Unexamined Patent Application Publication No. H04-278729, the noise blanker is provided in a stage subsequent to the bandwidth limiting filter. Therefore, the noise blanker detects the pulse noise from the receiving signal after the non-target signal has been removed by the bandwidth limiting filter and removes the pulse noise. However, the pulse noise after it passes the bandwidth limiting filter is extended in terms of time due to an influence of an impulse response of the bandwidth limiting filter, and an instantaneous amplitude level ends up being reduced. Therefore, it is possible that this noise blanker may not be able to detect the pulse noise from the receiving signal after it passes the bandwidth limiting filter with a high accuracy and remove this pulse noise with a high accuracy. That is, in this receiving apparatus, there is a problem that it is impossible to remove pulse noise using the noise blanker with a high accuracy.

A receiving apparatus according to one aspect of one embodiment includes: a first pulse noise determining unit configured to determine whether or not pulse noise is included in a receiving signal based on a first threshold; a first pulse noise removing unit configured to remove the pulse noise included in the receiving signal based on the result of the determination made by the first pulse noise determining unit; a bandwidth limiting filter configured to limit bandwidth of the receiving signal whose pulse noise has been removed by the first pulse noise removing unit to a predetermined bandwidth; a second pulse noise determining unit configured to determine whether pulse noise is included in the receiving signal whose bandwidth has been limited by the bandwidth limiting filter based on a second threshold; and a threshold controller configured to adjust the first threshold based on the result of the determination made by the second pulse noise determining circuit.

A receiving processing program according to one aspect of an embodiment causes a computer to execute the following processing of: first pulse noise determining processing for determining whether or not pulse noise is included in a receiving signal based on a first threshold; first pulse noise removing processing for removing the pulse noise included in the receiving signal based on the result of the determination made by the first pulse noise determining processing; bandwidth limiting filtering processing for limiting bandwidth of the receiving signal whose pulse noise has been removed by the first pulse noise removing processing to a predetermined bandwidth; second pulse noise determining processing for determining whether or not pulse noise is included in the receiving signal whose bandwidth has been limited by the bandwidth limiting filter processing based on a second threshold; and threshold controlling processing for adjusting the first threshold based on the result of the determination made by the second pulse noise determining processing.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

In the following description, with reference to the drawings, specific embodiments to which the present disclosure is applied will be described in detail. Throughout the drawings, the same symbols are given to the same components and overlapping descriptions will be omitted as necessary for the sake of clarification of the description.

First Embodiment

Figure 1:
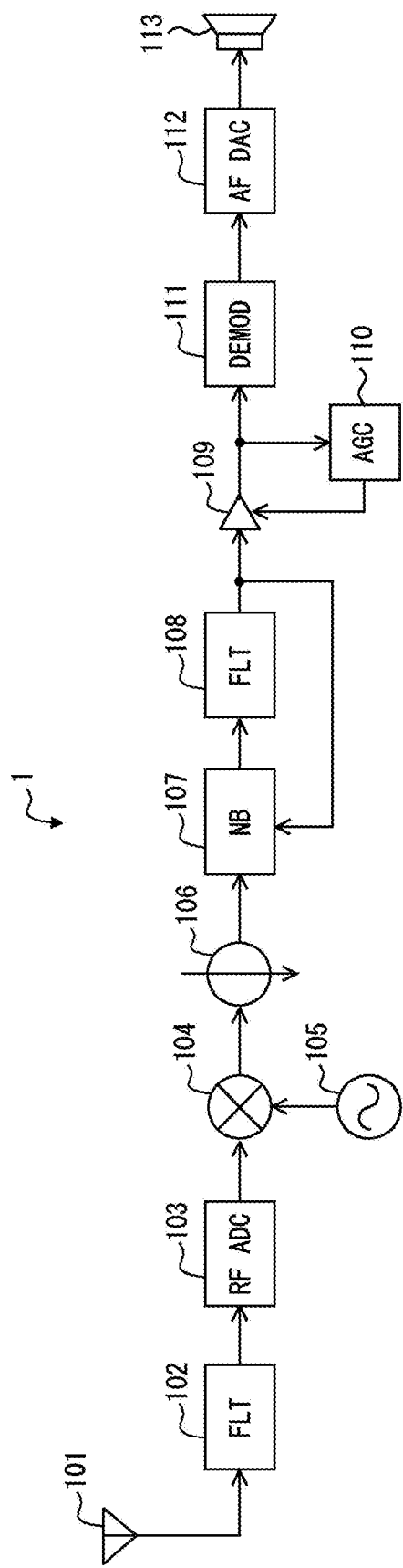
FIG. 1 is a block diagram showing a configuration example of a receiving apparatus according to a first embodiment.

FIG. 1 is a block diagram showing a configuration example of a receiving apparatus 1 according to a first embodiment.

As shown in FIG. 1, the receiving apparatus 1, which is a so-called direct sampling receiving apparatus, includes an antenna 101, a filter 102, an AD converter 103, a mixer 104, a local oscillator 105, a decimation filter 106, a noise blanker 107, a bandwidth limiting filter 108, an amplifier 109, an automatic gain control circuit 110, a detector 111, a DA converter 112, and a speaker 113.

The antenna 101 receives a radio signal transmitted from a transmitting apparatus (not shown). The filter 102 performs filtering of a radio signal (a receiving signal) received by the antenna 101. The AD converter 103 performs sampling of a high-frequency receiving signal output from the filter 102 and outputs the resulting signal as a digital receiving signal. The mixer 104 mixes the receiving signal output from the AD converter 103 with an oscillation signal output from the local oscillator 105, thereby converting the receiving signal into an Intermediate Frequency (IF) signal having a frequency lower than that of the receiving signal. The decimation filter 106 thins out sampling data of the IF signal and outputs the thinned-out data.

The noise blanker 107 blocks propagation of extraneous pulse noise included in the IF signal (the receiving signal) output from the decimation filter 106 (i.e., removes the pulse noise). The bandwidth limiting filter 108 limits the bandwidth of the IF signal, thereby removing an untargeted signal (a non-target signal) included in the IF signal and causing a target bandwidth signal (hereinafter this signal is also referred to as a transmission signal) to pass.

The amplifier 109 amplifies the IF signal that has passed the bandwidth limiting filter 108 and outputs the amplified signal. The automatic gain control circuit 110 automatically adjusts the gain of the amplifier 109 in such a way that the amplitude level of the output signal of the amplifier 109 is maintained at a predetermined level. The detector 111 detects (demodulates) the IF signal output from the amplifier 109. The DA converter 112 converts the IF signal detected by the detector 111 into an analog signal. Then the speaker 113 outputs the analog signal output from the DA converter 112 as a voice. (Details of noise blanker 107)

Figure 2:
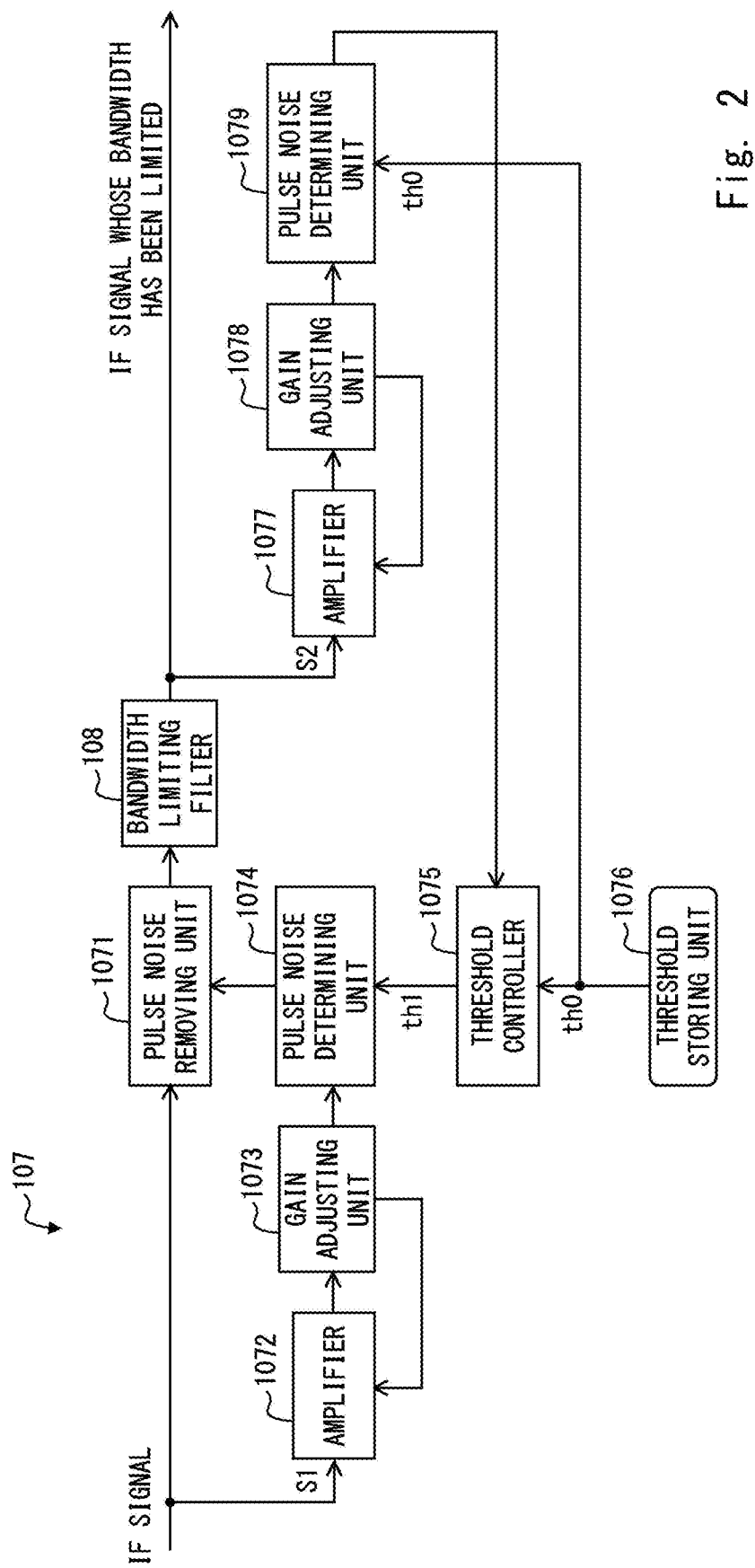
FIG. 2 is a block diagram showing a specific configuration example of a noise blanker and a bandwidth limiting filter provided in the receiving apparatus shown in FIG. 1.

Referring next to FIG. 2, the details of the noise blanker 107 will be described. FIG. 2 is a block diagram showing a specific configuration example of the noise blanker 107 and the bandwidth limiting filter 108 provided in the receiving apparatus 1.

As shown in FIG. 2, the noise blanker 107 includes a pulse noise removing unit (a pulse noise removing circuit) 1071, an amplifier 1072, a gain adjusting unit (a gain control circuit) 1073, a pulse noise determining unit (a pulse noise determining circuit) 1074, a threshold controller (a threshold control circuit) 1075, a threshold storing unit 1076, an amplifier 1077, a gain adjusting unit 1078, and a pulse noise determining unit (a pulse noise determining circuit) 1079.

The pulse noise determining unit 1074 determines whether pulse noise is included in the IF signal, which is the receiving signal, based on a threshold th1.

More specifically, first, the threshold controller 1075 outputs a threshold th0 stored in the threshold storing unit 1076 directly to the pulse noise determining unit 1074 as an initial value of the threshold th1. The amplifier 1072 amplifies a first signal for determination S1, which is a branch signal of the IF signal. The gain adjusting unit 1073 automatically adjusts the gain of the amplifier 1072 in such a way that the result of the amplification by the amplifier 1072 is maintained at a predetermined level. Then the pulse noise determining unit 1074 determines whether the pulse noise is included in the IF signal based on whether or not a gain adjustment amount per unit time adjusted by the gain adjusting unit 1073 has exceeded the threshold th1.

When, for example, the gain adjustment amount per unit time adjusted by the gain adjusting unit 1073 has exceeded the threshold th1, it is determined that a signal that suddenly changes, that is, pulse noise, has occurred in the IF signal. On the other hand, when the gain adjustment amount per unit time adjusted by the gain adjusting unit 1073 is equal to or smaller than the threshold th1, it is determined that the pulse noise has not occurred.

The pulse noise removing unit 1071 removes the pulse noise included in the IF signal based on the result of the determination made by the pulse noise determining unit 1074. The pulse noise removing unit 1071 attenuates the IF signal for a period that corresponds to a pulse width of the pulse noise at a timing when the pulse noise is detected, thereby removing this pulse noise. The IF signal whose pulse noise has been removed by the pulse noise removing unit 1071 is input to the bandwidth limiting filter 108.

When, for example, the non-target signal has a high signal intensity, the difference between the signal intensity of the pulse noise and that of the non-target signal becomes small, whereby it becomes difficult to determine the pulse noise by the pulse noise determining unit 1074. In this case, it is possible that the pulse noise removing unit 1071 may not be able to remove the pulse noise included in the IF signal every time it occurs.

As described above, the bandwidth limiting filter 108 limits the bandwidth of the IF signal, thereby removing an untargeted signal (a non-target signal) included in the IF signal and causing a target bandwidth signal (a transmission signal) to pass. Therefore, the IF signal that has passed the bandwidth limiting filter 108 includes the target bandwidth signal and pulse noise that could not be removed by the pulse noise removing unit 1071.

The pulse noise determining unit 1079 determines whether the IF signal whose bandwidth has been limited by the bandwidth limiting filter 108 includes pulse noise based on the threshold th0.

More specifically, first, the amplifier 1077 amplifies a second signal for determination S2, which is a branch signal of the IF signal that has passed the bandwidth limiting filter 108. The gain adjusting unit 1078 automatically adjusts the gain of the amplifier 1077 in such a way that the result of the amplification by the amplifier 1077 is maintained at a predetermined level. Then the pulse noise determining unit 1079 determines whether or not the IF signal that has passed the bandwidth limiting filter 108 includes pulse noise based on whether the gain adjustment amount per unit time adjusted by the gain adjusting unit 1078 has exceeded the threshold th0 stored in the threshold storing unit 1076. That is, the pulse noise determining unit 1079 determines whether the pulse noise that could not be removed by the pulse noise removing unit 1071 is included in the IF signal that has passed the bandwidth limiting filter 108.

When, for example, the gain adjustment amount per unit time adjusted by the amplifier 1077 has exceeded the threshold th0, it is determined that a signal that suddenly changes, that is, pulse noise, has occurred in the IF signal that has passed the bandwidth limiting filter 108. On the other hand, when the gain adjustment amount per unit time adjusted by the amplifier 1077 is equal to or smaller than the threshold th0, it is determined that the pulse noise has not occurred.

The threshold controller 1075 adjusts the threshold th1 based on the result of the determination made by the pulse noise determining unit 1079. When, for example, it is determined by the pulse noise determining unit 1079 that the number of occurrences of the pulse noise per predetermined period in the IF signal that has passed the bandwidth limiting filter 108 exceeds an allowable number (ideally 0), the threshold controller 1075 gradually decreases the threshold th1 from the current value. Accordingly, the detection sensitivity of the pulse noise detected by the pulse noise determining unit 1074 increases, whereby the pulse noise removing unit 1071 is able to remove the pulse noise whose number of occurrences is larger than that before the threshold th1 is adjusted.

After that, when it is determined by the pulse noise determining unit 1079 that the number of remaining occurrences of the pulse noise per predetermined period in the IF signal that has passed the bandwidth limiting filter 108 is equal to or smaller than the allowable number (ideally 0), the threshold controller 1075 fixes the threshold th1 to the current value. After a predetermined period of time has passed since the threshold th1 was fixed, the threshold th1 may be gradually increased. Accordingly, it is possible to allow the threshold th1 to follow the result of the determination made by the pulse noise determining unit 1079.

(Detailed Description of Method of Removing Pulse Noise by Noise Blanker 107)

Referring next to waveform diagrams shown in FIGS. 3 to 16, a method of removing the pulse noise by the noise blanker 107 will be described in detail.

Figure 3:
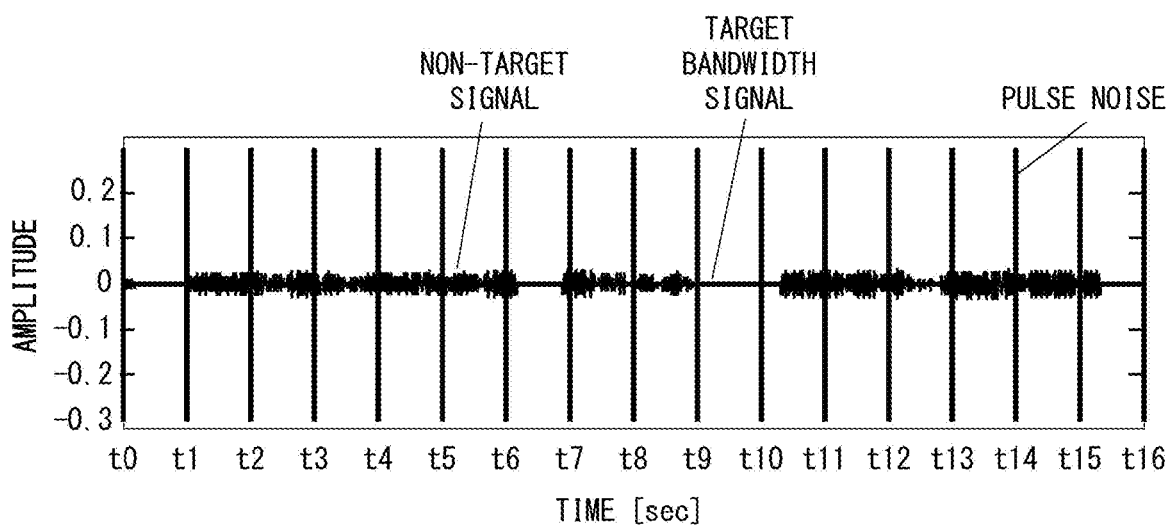
FIG. 3 is a waveform diagram showing an IF signal before pulse noise therein is removed by a pulse noise removing unit 1071.

FIG. 3 is a waveform diagram showing the IF signal (the receiving signal) before the pulse noise therein is removed by the pulse noise removing unit 1071. Referring to FIG. 3, the IF signal before the pulse noise is removed by the pulse noise removing unit 1071 includes the target bandwidth signal (the transmission signal), the non-target signal, and the pulse noise.

Figure 4:
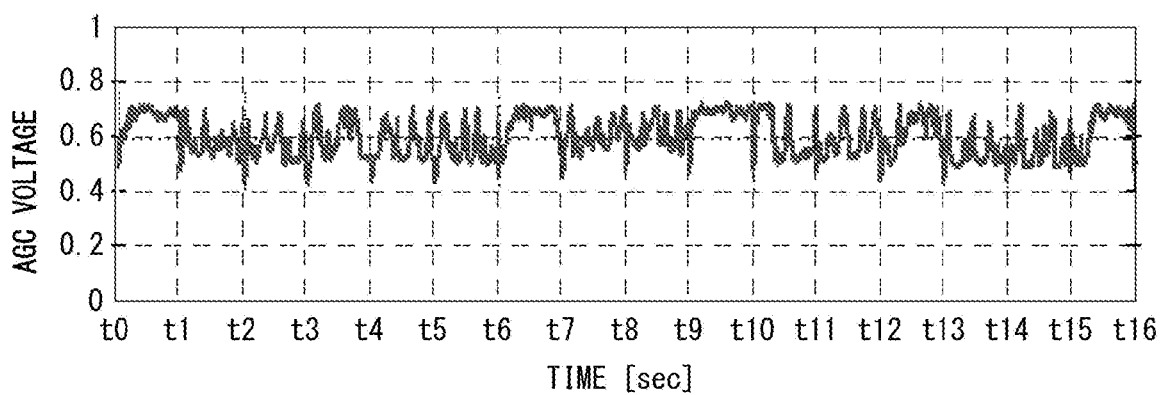
FIG. 4 is a waveform diagram showing a control voltage (AGC voltage) of an amplifier 1072 controlled by a gain adjusting unit 1073.

FIG. 4 is a waveform diagram showing a control voltage (AGC voltage; Automatic Gain Control voltage) of the amplifier 1072 controlled by the gain adjusting unit 1073. Further, FIG. 5 is a waveform diagram showing the threshold th1 before the adjustment and an amount of change per unit time of the control voltage controlled by the gain adjusting unit 1073.

Figure 5:
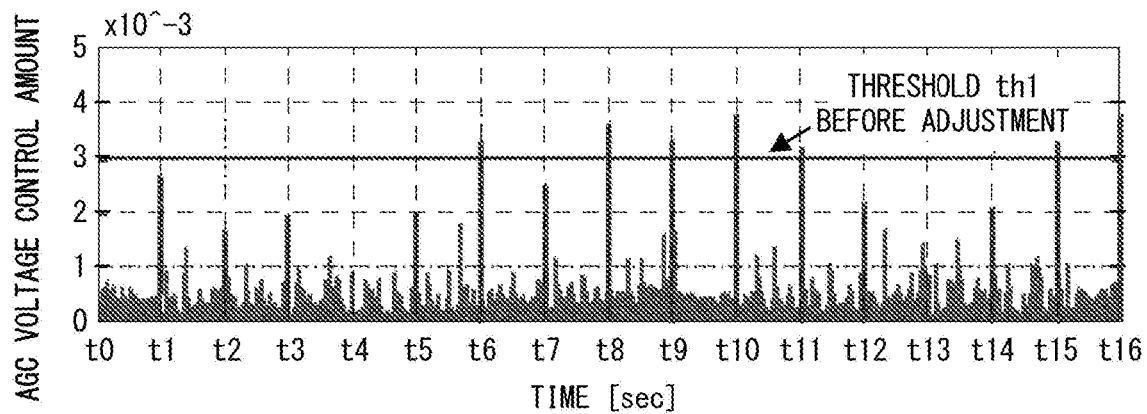
FIG. 5 is a waveform diagram showing a threshold th1 before adjustment and an amount of change per unit time of the control voltage controlled by the gain adjusting unit 1073.

Referring to FIG. 5, the amount of change per unit time of the control voltage controlled by the gain adjusting unit 1073 is large at the timing when the pulse noise is generated. In the example shown in FIG. 5, at time t6, t8, t9, t10, t11, t15, and t16, the amount of change per unit time of the control voltage controlled by the gain adjusting unit 1073 is larger than the threshold th1.

Figure 6:
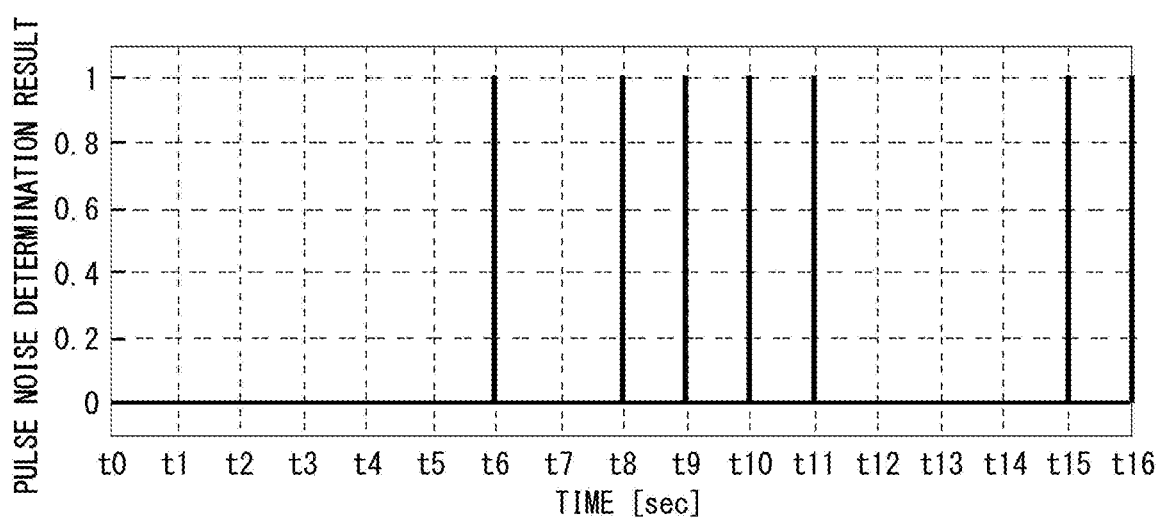
FIG. 6 is a waveform diagram showing a result of determination made by a pulse noise determining unit 1074.

FIG. 6 is a waveform diagram showing a result of the determination made by the pulse noise determining unit 1074. In the example shown in FIG. 6, when the pulse noise determining unit 1074 has determined that the pulse noise has not occurred, it outputs the result of the determination of the value 0. On the other hand, when the pulse noise determining unit 1074 has determined that the pulse noise has occurred, it outputs the result of the determination of the value 1.

Referring to FIG. 6, at time t6, t8, t9, t10, t11, t15, and t16 at which the amount of change per unit time of the control voltage controlled by the gain adjusting unit 1073 is larger than the threshold th1, the result of the determination indicates the value 1 (i.e., it is determined that the pulse noise is generated).

Therefore, the pulse noise removing unit 1071 removes the pulse noise determined to be occurring at the timing of time t6, t8, t9, t10, t11, t15, and t16.

Figure 7:
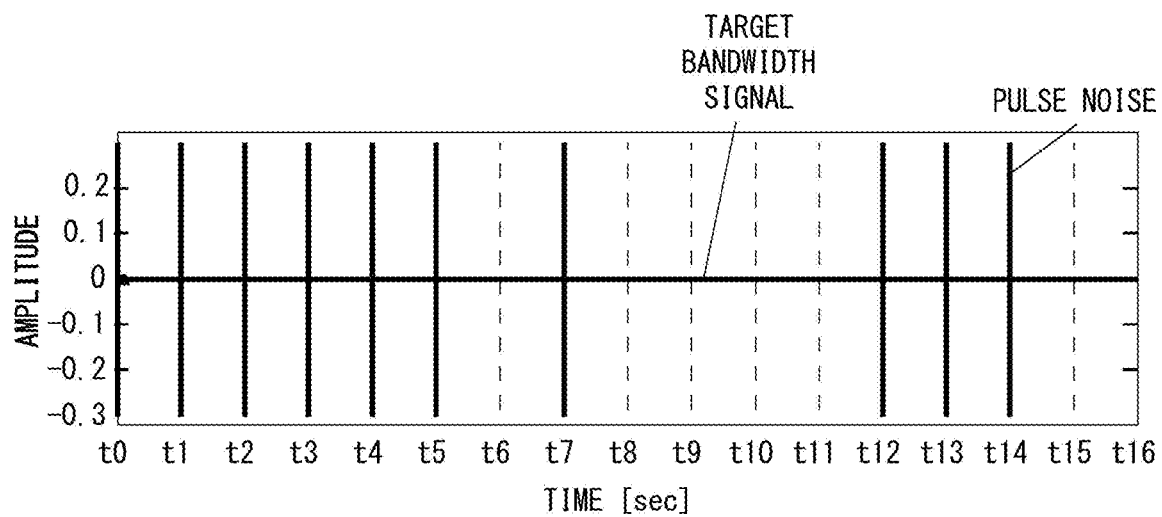
FIG. 7 is a waveform diagram showing an IF signal after it passes a bandwidth limiting filter 108.

FIG. 7 is a waveform diagram showing the IF signal (the receiving signal) after it passes the bandwidth limiting filter 108. Referring to FIG. 7, the IF signal after it passes the bandwidth limiting filter 108 includes the target bandwidth signal (the transmission signal), and pulse noise that could not be removed by the pulse noise removing unit 1071. On the other hand, the non-target signal has been removed by the bandwidth limiting filter 108.

Figure 8:
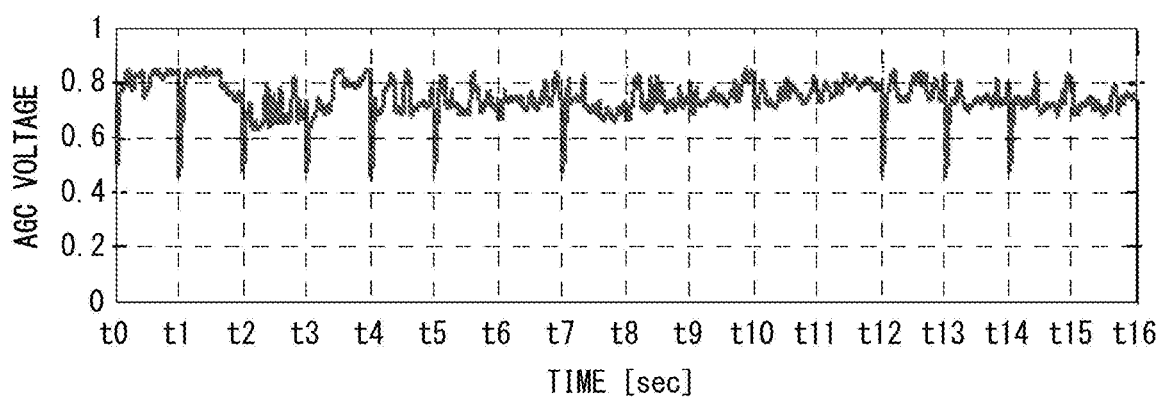
FIG. 8 is a waveform diagram showing a control voltage of an amplifier 1077 controlled by a gain adjusting unit 1078.
Figure 9:
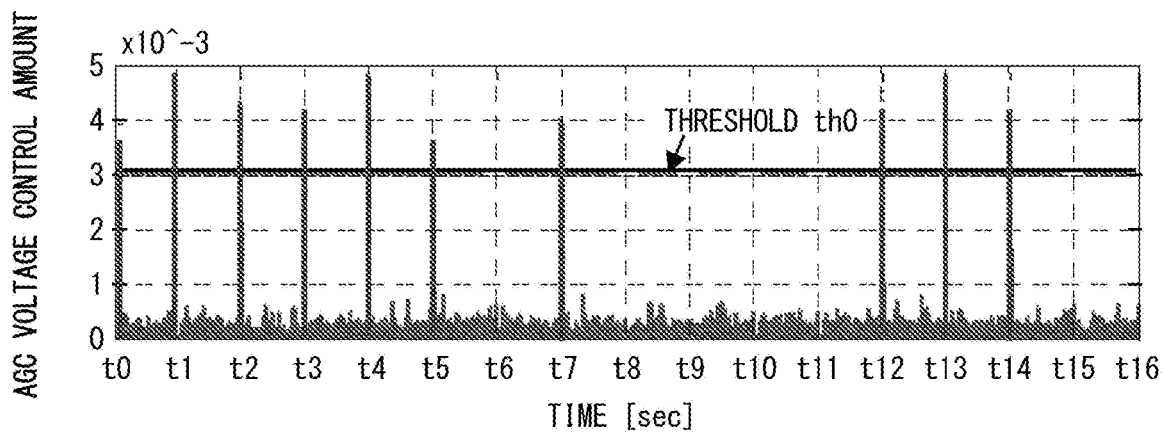
FIG. 9 is a waveform diagram showing an amount of change per unit time of the control voltage controlled by the gain adjusting unit 1078.

FIG. 8 is a waveform diagram showing a control voltage of the amplifier 1072 controlled by the gain adjusting unit 1078. Further, FIG. 9 is a waveform diagram showing the amount of change per unit time of the control voltage controlled by the gain adjusting unit 1078. Referring to FIG. 9, the amount of change per unit time of the control voltage controlled by the gain adjusting unit 1078 is large at the timing when the pulse noise is generated. In the example shown in FIG. 9, the amount of change per unit time of the control voltage controlled by the gain adjusting unit 1078 is larger than the threshold th0 at time t0, t1, t2, t3, t4, t5, t7, t12, t13, and t14.

Figure 10:
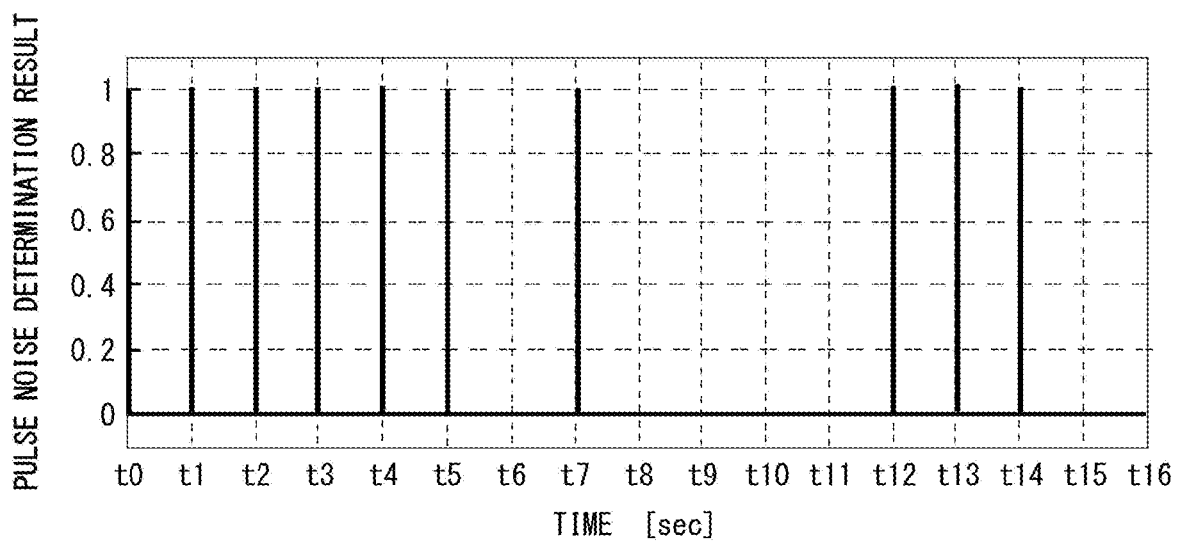
FIG. 10 is a waveform diagram showing a result of determination made by a pulse noise determining unit 1079.

FIG. 10 is a waveform diagram showing a result of the determination made by the pulse noise determining unit 1079. In the example shown in FIG. 10, when the pulse noise determining unit 1079 has determined that the pulse noise has not occurred, it outputs the result of the determination of the value 0. On the other hand, when the pulse noise determining unit 1079 has determined that the pulse noise has occurred, it outputs the result of the determination of the value 1.

Referring to FIG. 10, the result of the determination indicates the value 1 (i.e., it is determined that the pulse noise is generated) at time t0, t1, t2, t3, t4, t5, t7, t12, t13, and t14 at which the amount of change per unit time of the control voltage controlled by the gain adjusting unit 1078 is larger than the threshold th0.

According to the result of the determination made by the pulse noise determining unit 1079, since the number of remaining occurrences of the pulse noise in the IF signal is too large, the threshold th1 is adjusted by the threshold controller 1075. Specifically, the threshold controller 1075 adjusts the threshold th1 in such a way that it becomes smaller than the current value. Accordingly, the detection sensitivity of the pulse noise detected by the pulse noise determining unit 1074 increases.

Figure 11:
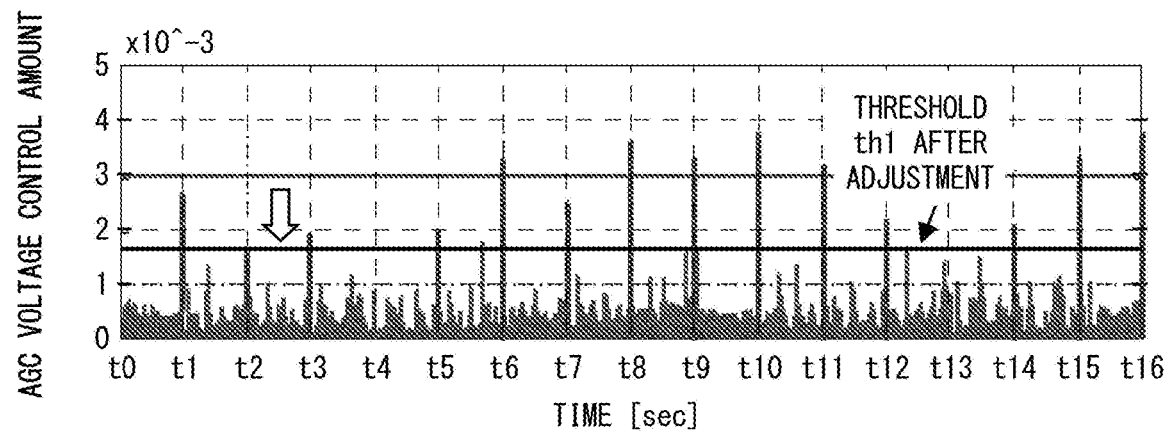
FIG. 11 is a waveform diagram showing a threshold th1 after the adjustment and the amount of change per unit time of the control voltage controlled by the gain adjusting unit 1073.

FIG. 11 is a waveform diagram showing the threshold th1 after the adjustment and the amount of change per unit time of the control voltage controlled by the gain adjusting unit 1073. Referring to FIG. 11, at time t1, t2, t3, t5, t6, t7, t8, t9, t10, t11, t12, t14, t15, and t16, the amount of change per unit time of the control voltage controlled by the gain adjusting unit 1073 is larger than the threshold th1.

Figure 12:
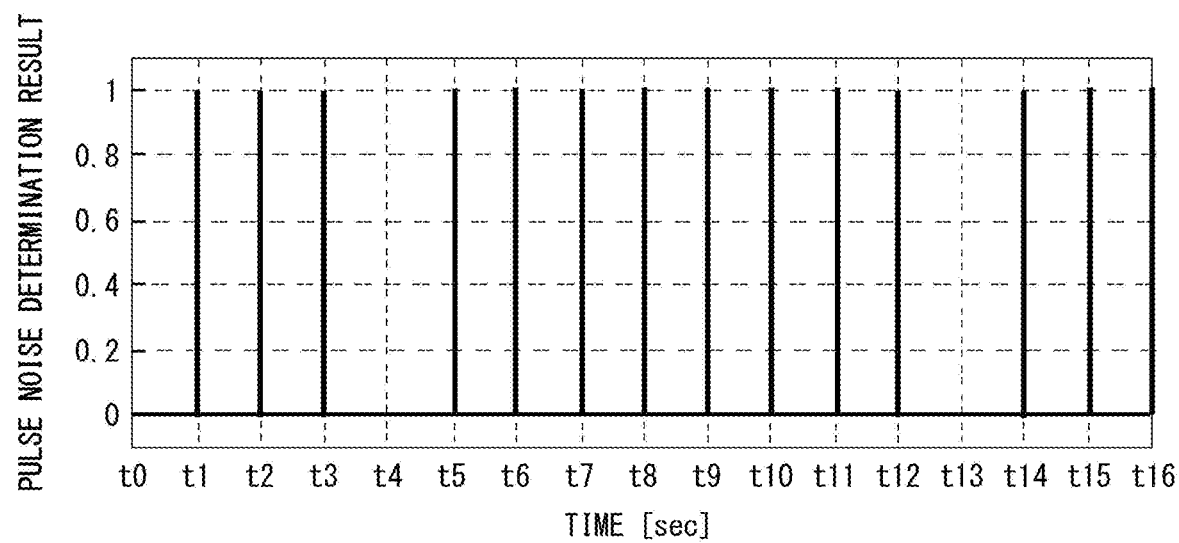
FIG. 12 is a waveform diagram showing a result of the determination made by the pulse noise determining unit 1074 after the adjustment of the threshold th1.

FIG. 12 is a waveform diagram showing the result of the determination made by the pulse noise determining unit 1074 after the adjustment of the threshold th1. Referring to FIG. 12, at time t1, t2, t3, t5, t6, t7, t8, t9, t10, t11, t12, t14, t15, and t16 at which the amount of change per unit time of the control voltage controlled by the gain adjusting unit 1073 is larger than the threshold th1, the result of the determination indicates the value 1 (that is, it is determined that the pulse noise is generated).

Therefore, the pulse noise removing unit 1071 removes the pulse noise determined to be occurring at the timing of time t1, t2, t3, t5, t6, t7, t8, t9, t10, t11, t12, t14, t15, and t16.

Figure 13:
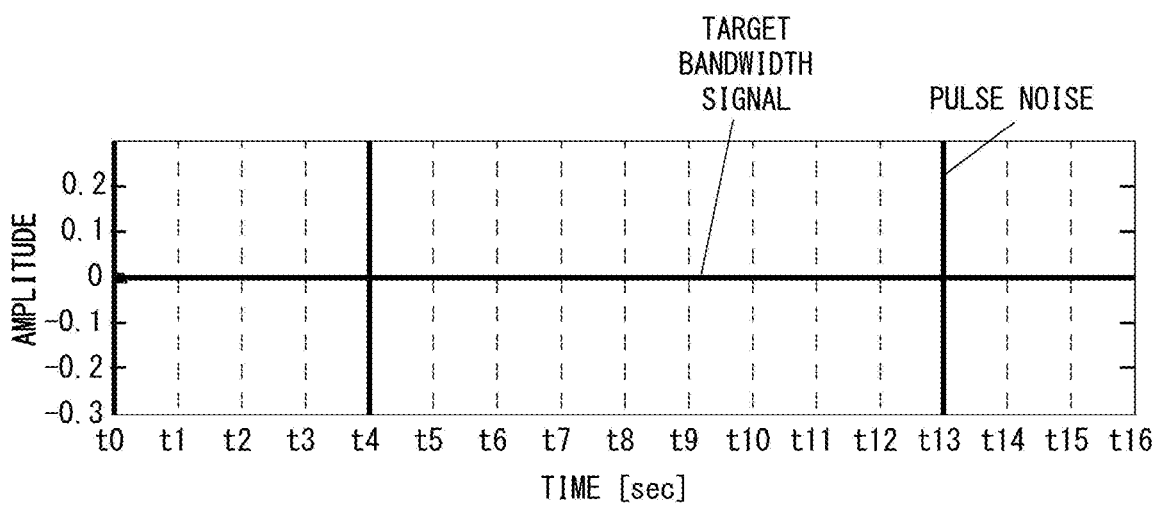
FIG. 13 is a waveform diagram showing an IF signal after it passes the bandwidth limiting filter 108 after the adjustment of the threshold th1.

FIG. 13 is a waveform diagram showing the IF signal (the receiving signal) after it passes the bandwidth limiting filter 108 after the adjustment of the threshold th1. Referring to FIG. 13, the IF signal after it passes the bandwidth limiting filter 108 includes the target bandwidth signal (the transmission signal) and the pulse noise that could not be removed by the pulse noise removing unit 1071. On the other hand, the non-target signal has been removed by the bandwidth limiting filter 108.

Figure 14:
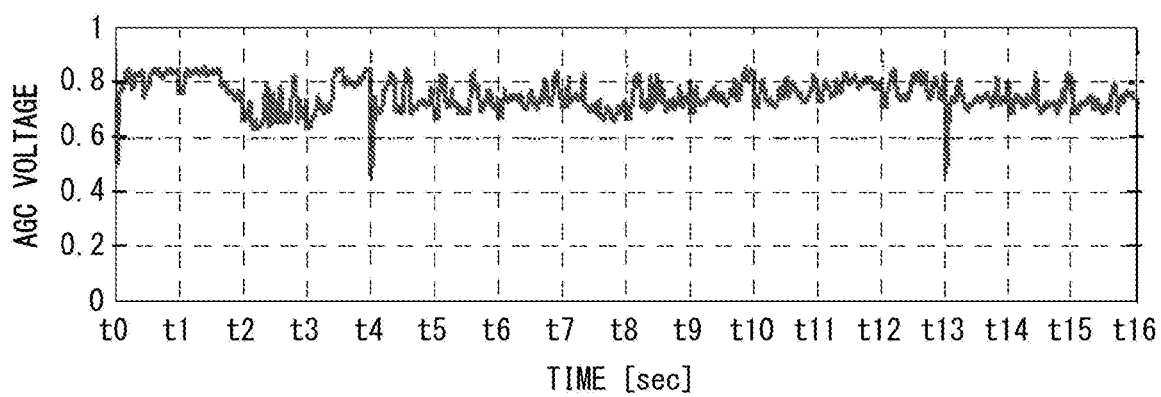
FIG. 14 is a waveform diagram showing the control voltage of the amplifier 1077 controlled by the gain adjusting unit 1078 after the adjustment of the threshold th1.
Figure 15:
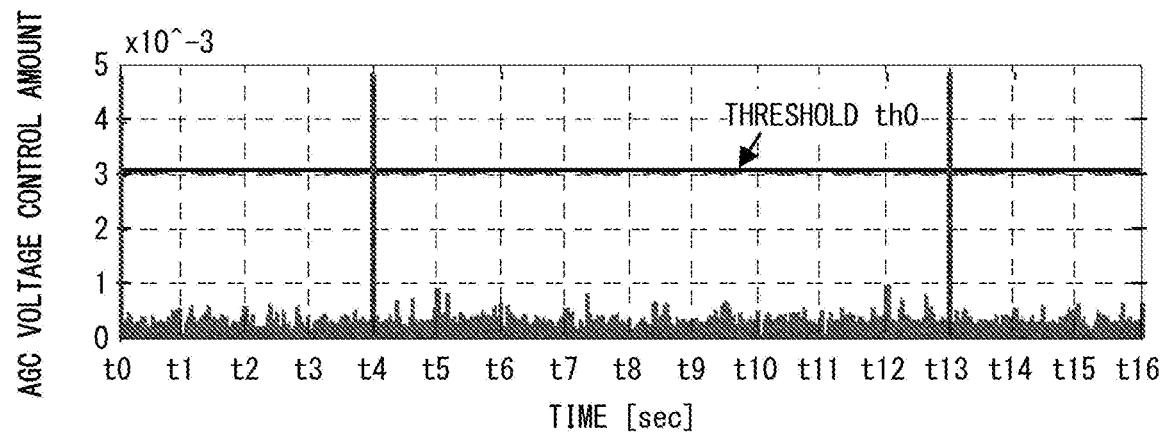
FIG. 15 is a waveform diagram showing an amount of change per unit time of the control voltage controlled by the gain adjusting unit 1078 after the adjustment of the threshold th1.

FIG. 14 is a waveform diagram showing a control voltage of the amplifier 1072 controlled by the gain adjusting unit 1078 after the adjustment of the threshold th1. Further, FIG. 15 is a waveform diagram showing the amount of change per unit time of the control voltage controlled by the gain adjusting unit 1078 after the adjustment of the threshold th1. Referring to FIG. 15, the amount of change per unit time of the control voltage controlled by the gain adjusting unit 1078 is large at the timing when the pulse noise is generated. In the example shown in FIG. 15, at time t0, t4, and t13, the amount of change per unit time of the control voltage controlled by the gain adjusting unit 1078 is larger than the threshold th0.

Figure 16:
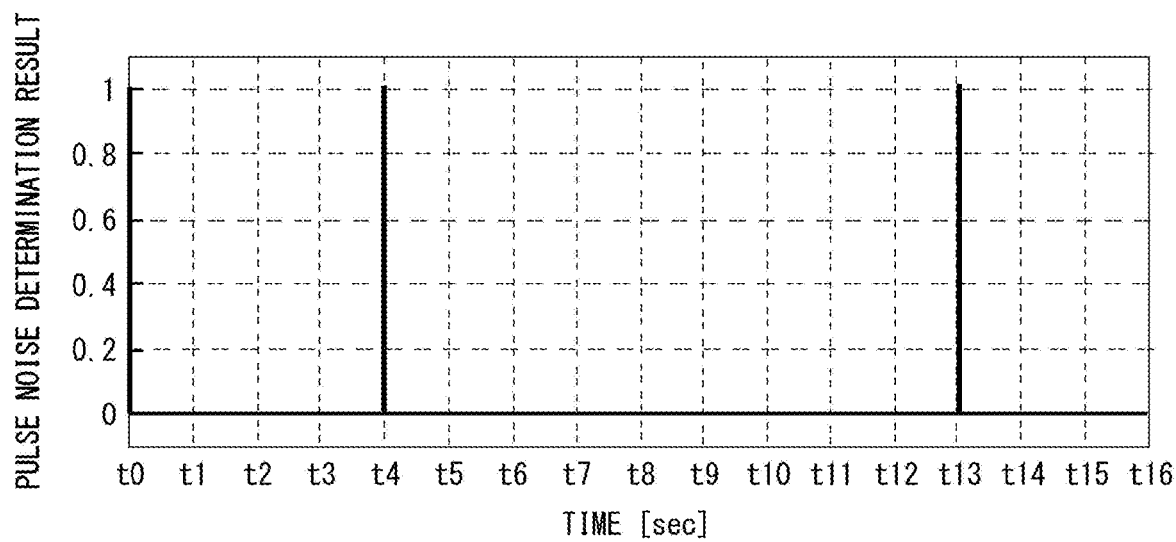
FIG. 16 is a waveform diagram showing a result of the determination made by the pulse noise determining unit 1079 after the adjustment of the threshold th1.

FIG. 16 is a waveform diagram showing the result of the determination made by the pulse noise determining unit 1079 after the adjustment of the threshold th1. Referring to FIG. 16, at time t0, t4, and t13 at which the amount of change per unit time of the control voltage controlled by the gain adjusting unit 1078 becomes larger than the threshold th0, the result of the determination indicates the value 1 (i.e., it is determined that the pulse noise is generated).

According to the result of the determination made by the pulse noise determining unit 1079, since the number of remaining occurrences of the pulse noise in the IF signal is within an allowable range, the threshold th1 is fixed to the current value. The threshold th1 may be gradually increased after a predetermined period of time has passed since the threshold th1 is fixed. Accordingly, it is possible to allow the threshold th1 to follow the result of the determination made by the pulse noise determining unit 1079.

As described above, in the receiving apparatus 1 according to this embodiment, the noise blanker 107 includes not only the pulse noise determining unit 1074 configured to determine whether or not the pulse noise is included in the receiving signal before passing the bandwidth limiting filter 108 and the pulse noise removing unit 1071 configured to remove the pulse noise included in the receiving signal before passing the bandwidth limiting filter 108 based on the result of the determination made by the pulse noise determining unit 1074 but also the following components. That is, the noise blanker 107 further includes the pulse noise determining unit 1079 configured to determine whether or not the pulse noise remains in the receiving signal after the non-target signal has been removed by the bandwidth limiting filter 108 and the threshold controller 1075 configured to adjust the detection sensitivity of the pulse noise detected by the pulse noise determining unit 1074 based on the result of the determination in such a way that the pulse noise that remains in the receiving signal after it passes the bandwidth limiting filter 108 is reduced (in such a way that it disappears, ideally).

Accordingly, first, the noise blanker 107 is able to remove the pulse noise while suppressing degradation of the transmission signal, which is due to the removal of the pulse noise (i.e., while suppressing voice deterioration), by detecting the pulse noise included in the receiving signal before passing the bandwidth limiting filter 108 and removing the detected pulse noise. Further, the noise blanker 107 determines whether or not the pulse noise remains in the receiving signal after the non-target signal has been removed by the bandwidth limiting filter 108 and adjusts the detection sensitivity of the pulse noise detected by the pulse noise determining unit 1074 based on the result of the determination. Accordingly, even when the non-target signal has a high signal intensity, the noise blanker 107 is able to detect the pulse noise and remove the detected pulse noise without being affected by it. That is, by using the noise blanker 107, the receiving apparatus 1 according to this embodiment is able to remove the pulse noise with a high accuracy while suppressing deterioration of the accuracy of receiving the target bandwidth signal (the transmission signal) (i.e., while suppressing voice deterioration).

Note that the method of determining the pulse noise by the pulse noise determining unit 1074 is not limited to the aforementioned method and may be changed as appropriate to another determination method including similar functions. In a similar way, the method of determining the pulse noise by the pulse noise determining unit 1079 is not limited to the aforementioned method and may be changed as appropriate to another determination method including similar functions.

(Comparison Between Related Art and Receiving Apparatus 1)

When a general noise blanker is provided at a stage subsequent to the bandwidth limiting filter like in the receiving apparatus disclosed in Japanese Unexamined Patent Application Publication No. H04-278729, the noise blanker detects the pulse noise from the receiving signal after the non-target signal has been removed by the bandwidth limiting filter and removes the detected pulse noise. Accordingly, even when the non-target signal has a high signal intensity, the noise blanker is able to detect the pulse noise and remove the detected pulse noise without being affected by it. However, the pulse noise after it passes the bandwidth limiting filter is extended in terms of time due to an influence of an impulse response of the bandwidth limiting filter, and an instantaneous amplitude level ends up being reduced. This phenomenon becomes prominent as the pass band of the bandwidth limiting filter becomes narrow. Therefore, it is possible that this noise blanker may not be able to detect the pulse noise from the receiving signal after it passes the bandwidth limiting filter and this pulse noise may not be removed. Further, even in a case in which the pulse noise is detected by this noise blanker and this pulse noise can thus be removed, the signal is attenuated for a period longer than the original pulse noise occurrence period, and thus the deterioration of the transmission signal ends up being increased. That is, there is a problem that this noise blanker cannot remove the pulse noise with a high accuracy.

Further, when the general noise blanker is provided in the previous stage of the bandwidth limiting filter, the noise blanker detects the pulse noise from the receiving signal before passing the bandwidth limiting filter and removes this detected pulse noise. Here, the pulse noise before passing the bandwidth limiting filter indicates an amplitude level that is short in terms of time and is instantaneously high with respect to the wide-band receiving signal. Therefore, the noise blanker is able to easily detect the pulse noise from the receiving signal before passing the bandwidth limiting filter and remove the detected pulse noise. Further, in this case, the signal is attenuated for a short period, which is the original pulse noise occurrence period, and thus the deterioration of the transmission signal can be reduced. However, when the non-target signal has a high signal intensity, the difference between the signal intensity of the pulse noise and that of the non-target signal becomes small. In this case, it becomes difficult to determine the pulse noise. Therefore, there is a problem that this noise blanker cannot be able to remove the pulse noise with a high accuracy when the non-target signal has a high signal intensity.

On the other hand, in the receiving apparatus 1 according to this embodiment, the noise blanker 107 includes, besides the pulse noise determining unit 1074 configured to determine whether or not the pulse noise is included in the receiving signal before passing the bandwidth limiting filter 108, and the pulse noise removing unit 1071 configured to remove the pulse noise included in the receiving signal before passing the bandwidth limiting filter 108 based on the result of the determination made by the pulse noise determining unit 1074, the following components. That is, the noise blanker 107 further includes the pulse noise determining unit 1079 configured to determine whether or not the pulse noise remains in the receiving signal after the non-target signal has been removed by the bandwidth limiting filter 108, and the threshold controller 1075 configured to adjust the detection sensitivity of the pulse noise detected by the pulse noise determining unit 1074 based on the result of the determination in such a way that the pulse noise that remains in the receiving signal after it passes the bandwidth limiting filter 108 is reduced (in such a way that it disappears, ideally).

Accordingly, first, the noise blanker 107 is able to remove the pulse noise while suppressing degradation of the transmission signal, which is due to the removal of the pulse noise (i.e., while suppressing voice deterioration) by detecting the pulse noise included in the receiving signal before passing the bandwidth limiting filter 108 and removing the detected pulse noise. Further, the noise blanker 107 determines whether or not the pulse noise remains in the receiving signal after the non-target signal has been removed by the bandwidth limiting filter 108 and adjusts the detection sensitivity of the pulse noise detected by the pulse noise determining unit 1074 based on the result of the determination. Accordingly, even when the non-target signal has a high signal intensity, the noise blanker 107 is able to detect the pulse noise and remove the detected pulse noise without being affected by it. That is, the receiving apparatus 1 according to this embodiment is able to remove the pulse noise with a high accuracy while suppressing deterioration of the accuracy of receiving the target bandwidth signal (the transmission signal) (i.e., while suppressing voice deterioration) by using the noise blanker 107.

(Other Application Cases of Noise Blanker 107)

Figure 17:
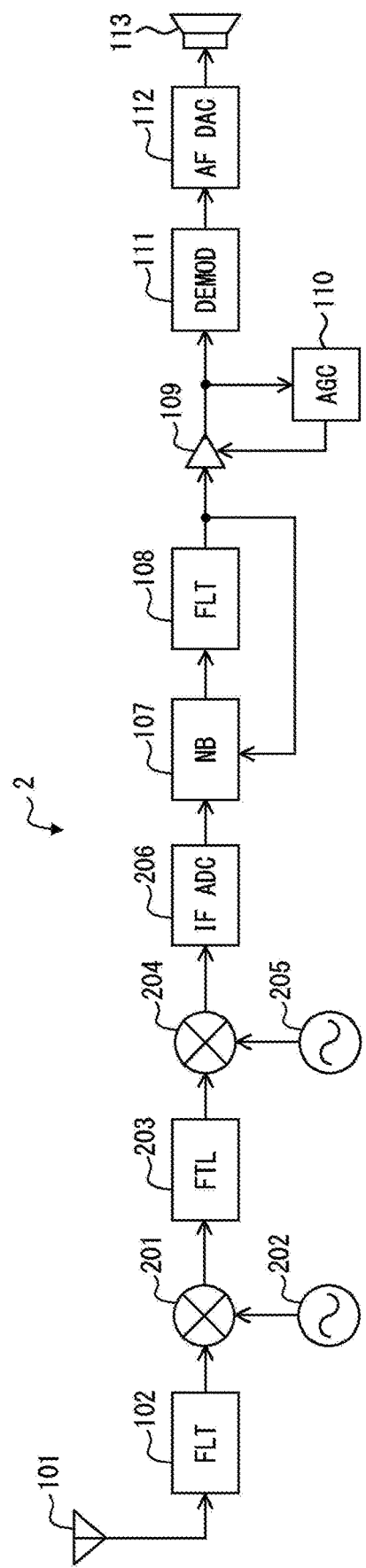
FIG. 17 is a block diagram showing another application case of the noise blanker provided in the receiving apparatus shown in FIG. 1.

Note that the noise blanker 107 is not limited to being applied to the direct sampling receiving apparatus 1 and may be applied to, for example, a superheterodyne receiving apparatus 2. FIG. 17 is a block diagram showing a configuration example of the superheterodyne receiving apparatus 2 to which the noise blanker 107 is applied.

As shown in FIG. 17, the receiving apparatus 2 includes a mixer 201, a local oscillator 202, a filter 203, a mixer 204, a local oscillator 205, and an AD converter 206 in place of the AD converter 103, the mixer 104, the local oscillator 105, and the decimation filter 106 included in the receiving apparatus 1.

The mixer 201 mixes the high-frequency receiving signal output from the filter 102 with the oscillation signal output from the local oscillator 202, thereby converting the resulting signal into a signal having a frequency lower than that of the receiving signal. The filter 203 performs filtering of the signal output from the mixer 201. The mixer 204 mixes the output signal of the filter 203 with the oscillation signal output from the local oscillator 205, thereby converting the resulting signal into an IF signal having a frequency lower than that of the output signal. The AD converter 206 performs sampling of the IF signal output from the mixer 204 and outputs the resulting signal as a digital IF signal.

The noise blanker 107 blocks propagation of extraneous pulse noise (remove pulse noise) included in the IF signal output from the AD converter 206. Since the other configurations and operations of the receiving apparatus 2 are similar to those of the receiving apparatus 1, the descriptions thereof will be omitted.

As described above, the noise blanker 107 is not limited to being applied to the direct sampling receiving apparatus 1 and may be applied also to another receiving apparatus such as the superheterodyne receiving apparatus 2.

Second Embodiment

Figure 18:
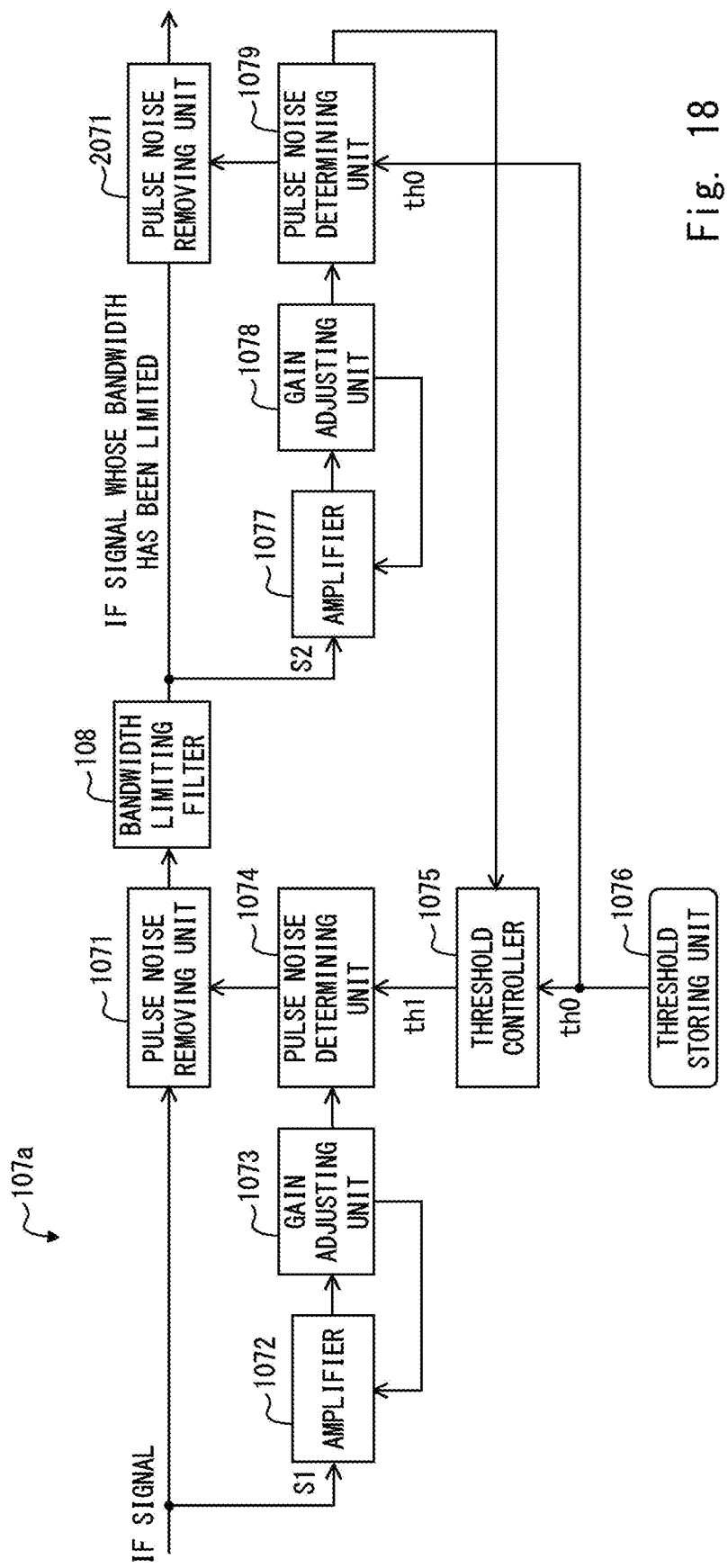
FIG. 18 is a block diagram showing a specific configuration example of a noise blanker and a bandwidth limiting filter provided in a receiving apparatus according to a second embodiment.

FIG. 18 is a block diagram showing a configuration example of a noise blanker 107a and a bandwidth limiting filter 108 provided in the receiving apparatus 1a according to the second embodiment.

As shown in FIG. 18, the receiving apparatus 1a includes the noise blanker 107a in place of the noise blanker 107 provided in the receiving apparatus 1. The noise blanker 107a further includes, besides the components of the noise blanker 107, a pulse noise removing unit 2071.

The pulse noise removing unit 2071 removes pulse noise included in the IF signal whose bandwidth has been limited by the bandwidth limiting filter 108 based on the result of the determination made by the pulse noise determining unit 1079. That is, the pulse noise removing unit 2071 removes the pulse noise that could not be removed by the pulse noise removing unit 1071.

Since the other configurations and operations of the noise blanker 107a and the receiving apparatus 1a are similar to those of the noise blanker 107 and the receiving apparatus 1, respectively, the descriptions thereof will be omitted.

As described above, in the receiving apparatus 1a, the noise blanker 107a further includes, besides the components of the noise blanker 107, a pulse noise removing unit 2071 in a stage subsequent to the bandwidth limiting filter 108. Accordingly, the receiving apparatus 1a is able to not only achieve effects similar to those achieved in the receiving apparatus 1 but also remove the pulse noise that could not be removed in the receiving apparatus 1, although there is some voice deterioration in the receiving apparatus 1a.

While the present disclosure has been described as a hardware configuration in the aforementioned embodiments, this disclosure is not limited thereto. The present disclosure may achieve a part or all of the processing of the receiving apparatus 1 by causing a Central Processing Unit (CPU) to execute a computer program.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present disclosure has been described with reference to the embodiments, the present disclosure is not limited to them. Various changes that can be understood by one skilled in the art may be made to the configurations and the details of the present application within the scope of the disclosure.

According to the above embodiments, it is possible to provide a receiving apparatus and a receiving processing program capable of removing pulse noise with a high accuracy.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A receiving apparatus comprising:
    a first pulse noise determining circuit configured to determine whether or not pulse noise is included in a receiving signal based on a first threshold;
    a first pulse noise removing circuit configured to remove the pulse noise included in the receiving signal based on the result of the determination made by the first pulse noise determining circuit;
    a bandwidth limiting filter configured to limit bandwidth of the receiving signal whose pulse noise has been removed by the first pulse noise removing circuit to a predetermined bandwidth;
    a second pulse noise determining circuit configured to determine whether pulse noise is included in the receiving signal whose bandwidth has been limited by the bandwidth limiting filter based on a second threshold; and
    a threshold control circuit configured to adjust the first threshold based on the result of the determination made by the second pulse noise determining circuit.

2. The receiving apparatus according to claim 1, further comprising a second pulse noise removing circuit configured to remove pulse noise included in the receiving signal whose bandwidth has been limited by the bandwidth limiting filter based on the result of the determination made by the second pulse noise determining circuit.

3. The receiving apparatus according to claim 1, further comprising:
    a first amplifier configured to amplify a first signal for determination by the first pulse noise determining circuit, which is a branch signal of the receiving signal;
    a first gain control circuit configured to adjust gain of the first amplifier in such a way that an amplitude level of the first signal amplified by the first amplifier is maintained at a predetermined level;
    a second amplifier configured to amplify a second signal for determination by the second pulse noise determining circuit, which is a branch signal of the receiving signal whose bandwidth has been limited by the bandwidth limiting filter; and
    a second gain control circuit configured to adjust gain of the second amplifier in such a way that the amplitude level of the second signal amplified by the second amplifier is maintained at a predetermined level, wherein
    the first pulse noise determining circuit is configured to determine whether or not the pulse noise is included in the receiving signal based on whether the amount of adjustment of the gain per unit time of the first amplifier by the first gain control circuit has exceeded the first threshold, and
    the second pulse noise determining circuit is configured to determine whether or not the pulse noise is included in the receiving signal whose bandwidth has been limited by the bandwidth limiting filter based on whether the amount of adjustment of the gain per unit time of the second amplifier by the second gain control circuit has exceeded the second threshold.

4. A non-transitory computer readable medium storing a receiving processing program for causing a computer to execute the following processing of:
    first pulse noise determining processing for determining whether or not pulse noise is included in a receiving signal based on a first threshold;
    first pulse noise removing processing for removing the pulse noise included in the receiving signal based on the result of the determination made by the first pulse noise determining processing;
    bandwidth limiting filtering processing for limiting bandwidth of the receiving signal whose pulse noise has been removed by the first pulse noise removing processing to a predetermined bandwidth;
    second pulse noise determining processing for determining whether or not pulse noise is included in the receiving signal whose bandwidth has been limited by the bandwidth limiting filter processing based on a second threshold; and threshold controlling processing for adjusting the first threshold based on the result of the determination made by the second pulse noise determining processing.

* * * * *